United States Patent
Conover (10) Patent No.: US 9,639,385 B2
(45) Date of Patent: May 2, 2017

(54) SYSTEMS AND METHODS TO LOAD APPLICATIONS AND APPLICATION DATA INTO A VIRTUAL MACHINE USING HYPERVISOR-ATTACHED VOLUMES

(71) Applicant: CloudVolumes Inc., Santa Clara, CA (US)

(72) Inventor: Matthew Conover, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 84 days.

(21) Appl. No.: 14/458,586

(22) Filed: Aug. 13, 2014

(65) Prior Publication Data
US 2014/0351815 A1   Nov. 27, 2014

Related U.S. Application Data

(63) Continuation of application No. 13/247,693, filed on Sep. 28, 2011, now abandoned.

(60) Provisional application No. 61/428,690, filed on Dec. 30, 2010, provisional application No. 61/475,832, filed on Apr. 15, 2011, provisional application No. 61/475,881, filed on Apr. 15, 2011.

(51) Int. Cl.
*G06F 9/455* (2006.01)
(52) U.S. Cl.
CPC ...... *G06F 9/45533* (2013.01); *G06F 9/45558* (2013.01); *G06F 2009/45579* (2013.01)
(58) Field of Classification Search
CPC ............................ G06F 9/45533; G06F 9/5077
USPC .................................................................. 718/1
See application file for complete search history.

(56) References Cited

U.S. PATENT DOCUMENTS

| | | | |
|---|---|---|---|
| 8,555,274 B1 * | 10/2013 | Chawla | G06F 9/5077 718/1 |
| 8,677,351 B2 | 3/2014 | Le et al. | |
| 2010/0281083 A1 | 11/2010 | Purtell, II et al. | |
| 2011/0055299 A1 | 3/2011 | Phillips | |
| 2011/0202714 A1 * | 8/2011 | Burch | G06F 17/30067 711/112 |
| 2012/0054742 A1 | 3/2012 | Eremenko et al. | |
| 2013/0290960 A1 * | 10/2013 | Astete | G06F 9/45533 718/1 |

OTHER PUBLICATIONS

Moulster, Ian, "Microsoft Virtual Desktop 101—Making Sense of VDI, RDS, App-V, MED-V and Desktop Virtualisation," internet site located at http://blogs.msdn.com/b/ianm/archive/2010/06/11/nnicrosoft-virtual-desktop-101-making-sense-of-vdi-rds-app-v-med-v-and-desktop-virtualisation.aspx, Jun. 11, 2010, accessed Aug. 4, 2014, 10 pages.
vWorkspace—MokaFive Suite LivePC Admin Guide, 4 pages.
(Continued)

*Primary Examiner* — Emerson Puente
*Assistant Examiner* — Steven Do (57) ABSTRACT

Systems, methods, and software are described herein for operating a data management system, including a virtual machine agent running within a virtual machine responding to an attach-triggering event, determining selected storage volumes to be attached to the virtual machine based on a request generated by the virtual agent in response to the attach-triggering event, and dynamically attaching the selected storage volumes to the virtual machine.

20 Claims, 3 Drawing Sheets

(56) References Cited

OTHER PUBLICATIONS

Rintalan, Nick, "Digging into RingCube", internet site located at http://blogs.citrix.com/2011/08/29digging-into-ringcube/, published Aug. 29, 2011, accessed Aug. 12, 2014, 9 pages.
"RingCube vDesk over VDI: Next Generation Virtual Desktop Infrastructure", Solution Brief for RingCube Technologies, Inc., 2009, 7 pages, Mountain View, California, USA.

* cited by examiner

SYSTEMS AND METHODS TO LOAD APPLICATIONS AND APPLICATION DATA INTO A VIRTUAL MACHINE USING HYPERVISOR-ATTACHED VOLUMES

RELATED APPLICATIONS

This application is a continuation application of pending U.S. patent application Ser. No. 13/247,693, filed Sep. 28, 2011, and entitled "SYSTEMS AND METHODS TO LOAD APPLICATIONS AND APPLICATION DATA INTO A VIRTUAL MACHINE USING HYPERVISOR-ATTACHED VOLUMES," which claims the benefit of and priority to U.S. Provisional Application Ser. No. 61/428,690 filed Dec. 30, 2010 and entitled "METHOD AND APPARATUS TO LOAD USER DATA AND APPLICATION INTO A VIRTUAL DESKTOP USING DYNAMICALLY ATTACHED STORAGE," U.S. Provisional Application Ser. No. 61/475,832 filed Apr. 15, 2011 and entitled "SYSTEMS AND METHODS TO LOAD APPLICATIONS AND APPLICATION DATA INTO A VIRTUAL MACHINE USING HYPERVISOR-ATTACHED VOLUMES," and U.S. Provisional Application Ser. No. 61/475,881 filed Apr. 15, 2011 and entitled "SYSTEMS AND METHODS TO CONCURRENTLY SHARE APPLICATIONS ACROSS MULTIPLE VIRTUAL MACHINES," the disclosures of which are hereby incorporated by reference in their entireties.

TECHNICAL BACKGROUND

A "virtual machine" is a virtualized copy of a computer system, with virtual hardware (including disk controller, network card, etc.). Frequently, running within the virtual machine is a full operating system. These virtual machines run on a physical host server known as a hypervisor. The hypervisor abstracts the physical hardware of the host server so that the virtual machine sees virtual hardware regardless of what the underlying hardware actually is. The storage volumes that appear within the virtual machine are virtualized storage volumes provided by the hypervisor. The storage volumes visible from within the virtual machine can come from multiple sources.

Virtual machines may be centrally managed in an enterprise and used by different departments. Because of this, the purpose of the virtual machine (and the software used on it) may change over time. Managing application usage across the enterprise, such as uninstalling a large application and installing another application can be time consuming and very resource intensive.

OVERVIEW

A method of operating a data management system includes starting a virtual machine software agent running within a virtual machine based on an attach-triggering event, determining selected volumes to be attached to the virtual machine based on the attach-triggering event, and dynamically attaching the selected volumes to the virtual machine.

TECHNICAL DESCRIPTION

Systems and methods are provided herein to make applications and application data available within a virtual machine (VM) at runtime without a reboot. In at least one example, a virtual machine software agent (hereinafter referred to as a VM agent) running inside a virtual machine contacts a virtual machine manager (hereinafter referred to as a VM manager) to notify the VM manager of an event which results in the VM manager requesting a hypervisor to dynamically attach a storage volume to the virtual machine when certain conditions are met. These conditions can include the identification of the user, which may in turn identify groups to which the user belongs, user preferences, etc. Based on these user and group specific criteria, several types of storage volumes are provided to the user, which may allow the system to provide a persistent virtual environment for the user in an efficient manner, as well as providing applications in an efficient manner as appropriate across the network. Similarly, the storage volumes that should be attached to a virtual machine could be based on the virtual machine rather than the user. In addition, the virtual machine could belong to a group of related virtual machines. For example, a virtual machine could belong to a web server group that is associated with a storage volume containing a web server application.

Figure 1:
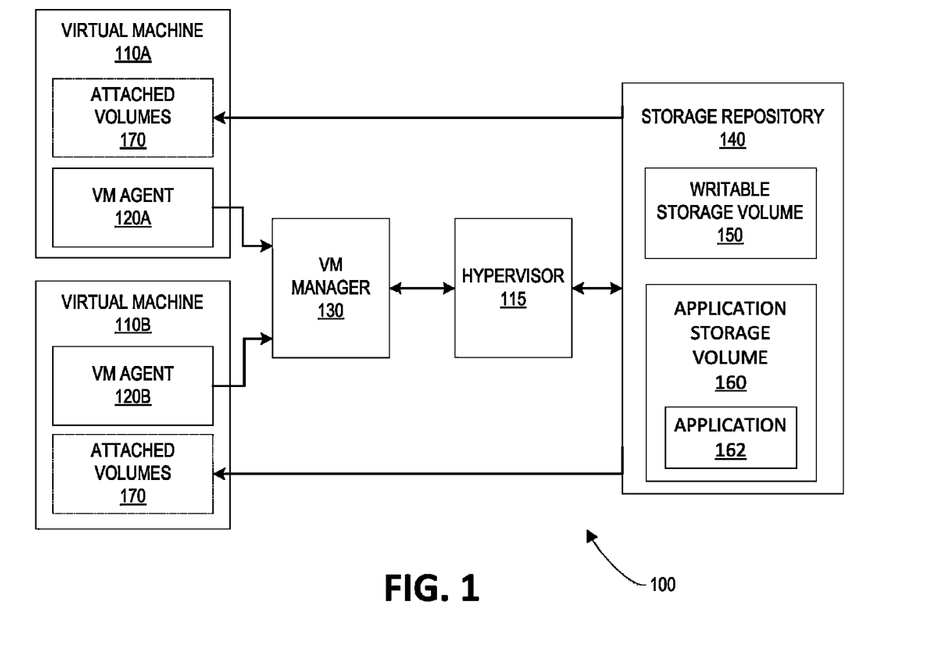
FIG. 1 illustrates a data management system according to one example.

FIG. 1 illustrates a system 100 configured to load data and/or applications to one or more target virtual machines 110A, 110B from storage volumes that are attached by a hypervisor 115. In at least one example, the hypervisor 115 may be a computing device or group of computing devices on which the target virtual machines 110A, 110B run. Although shown as a single computing device, the hypervisor 115 may operate on as many computing devices and/or in as many environments as desired.

The system 100 may also include VM agents 120A, 120B running within the virtual machines 110A, 110B. The VM agent 120 is configured to interact with a VM manager 130. In at least one example, the VM manager 130 is a virtual appliance running on or supported by the hypervisor 115. It will be appreciated that the VM manager 130 may also be a separate appliance as desired, as shown schematically in FIG. 1. In the illustrated example, the VM manager 130 determines which of various storage volumes in a storage repository 140, including writable storage volume(s) 150 and application volume(s) 160, should be attached to the virtual machines 110A, 110B. The VM manager 130 then causes the hypervisor 115 to attach the selected writable storage volumes 150 and application storage volumes 160 to the appropriate target virtual machine 110A, 110B.

As shown representatively in FIG. 1, the attached storage volumes 170 may then be attached to the target virtual machines 110A, 110B. The attached storage volumes 170 are shown within the target virtual machines 110 to emphasize the attachment of the selected storage volumes 170, though it will be appreciated that the selected storage volume 170 may not actually be transferred into the target virtual machines 170. Typically, the disk blocks in the storage volume would only be accessed by the hypervisor and transferred into the virtual machine upon a disk read event from the virtual machine.

As will be discussed in more detail at an appropriate point hereinafter, the system 100 is configured to make the application storage volume 160, including one or more applications 162 stored thereon, available to a plurality of virtual machines (represented schematically as the virtual machines 110A, 110B) concurrently.

In at least one example, the hypervisor 115 abstracts the physical hardware of the host computing device so that the virtual machine sees virtual hardware regardless of what the underlying hardware actually is. The application storage volume 160 is mounted by the hypervisor 115 to thereby allow the virtual machines 110A, 110B to access the application 162 on the application storage volume 160 through the hypervisor 115. For example, if the storage volume 160 is concurrently attached by hypervisor 115 to virtual machines 110A, 110B the storage volume 160 would appear as a locally attached hard disk (such as a SCSI disk) within the virtual machine. In at least one example, the application 162 may be stored on the application storage volume 160 as a read only volume. As a result, the virtual machines 110A, 110B may be able to only access and execute the application 162 rather than modify the application. In at least one example, the application storage volume 160 may be attached as a non-persistent writable volume to enable it to be concurrently shared. In this way, the application or its data may be modified by virtual machine 110A, 110B but the changes will be discarded once the application storage volume 160 is detached from the virtual machine.

Such configurations may allow the application 162 to be accessed by the virtual machines 110A, 110B concurrently. For example, as illustrated in FIG. 1, the hypervisor 115 can attach the application 162 to one or more of the virtual machines 110A, 110B concurrently as desired. The attachment of the application 162 to the virtual machine may be performed in any desired manner.

In one embodiment, the application storage volume 160 can be statically attached to one of the virtual machines 110A, 110B, in which case it will remain permanently attached to the virtual machine 110A, 110B. In another embodiment, the VM agents 120A, 120B running in the virtual machines 110A, 110B can dynamically request the VM manager 130 to request the hypervisor 115 to attach the application storage volume 160 on demand. This may be desirable, for example, to enable an IT administrator to track software license compliance by tracking how many virtual machines are concurrently using an application. Such a configuration may allow the system to load applications and data into the target virtual machine automatically or dynamically as desired. Similarly, a user or administrator could directly interact with the VM manager 130 to request an application storage volume be attached to or detached from a plurality of virtual machines on demand. To this end, the VM manager 130 could expose a management interface for users and administrators to interact with.

Figure 2:
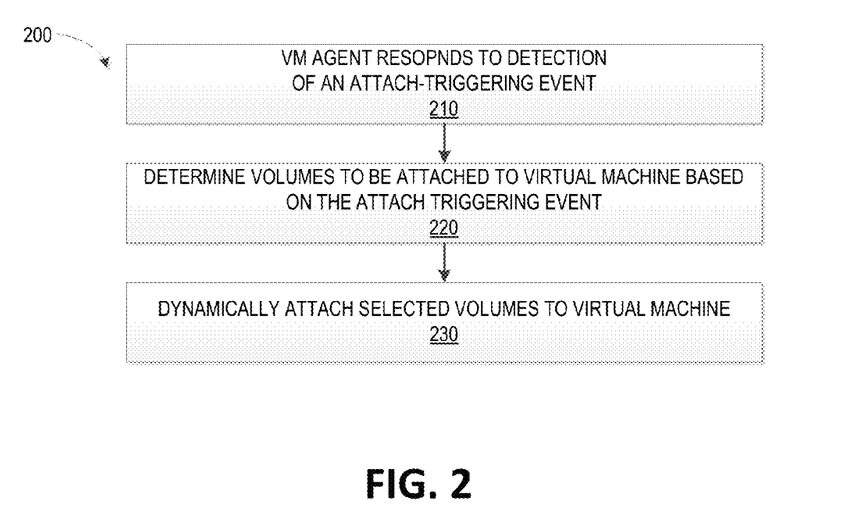
FIG. 2 illustrates the operation of a data management system.

FIG. 2 is a flowchart illustrating a method 200 for loading applications and data into a virtual machine. As shown in FIG. 2, the method begins at step 210 with a VM agent responding to the detection of an attach-triggering event. Based on the detection of the attach-triggering event, at step 220 volumes to be attached to the target virtual machine are identified. Thereafter, at step 230 the selected volumes are dynamically attached to the target virtual machine. Attaching the volume dynamically may allow for sharing an application across multiple virtual machines simultaneously.

Figure 3:
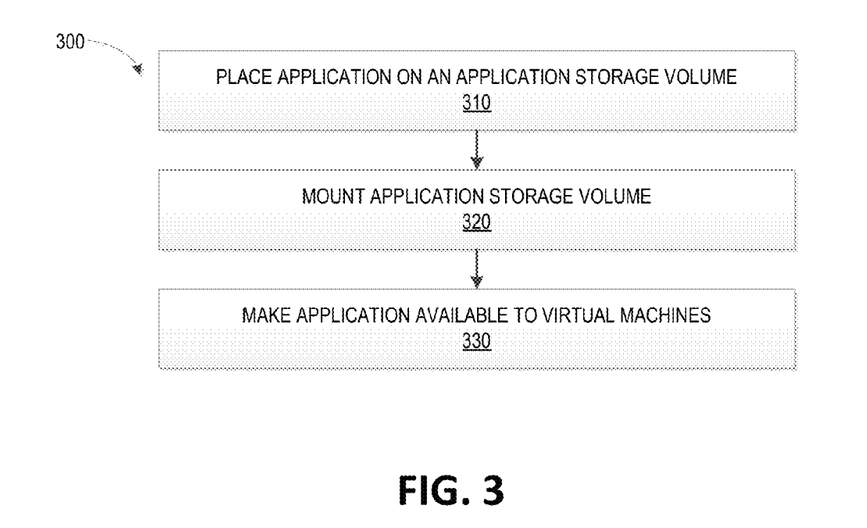
FIG. 3 illustrates the operation of a data management system.

FIG. 3 is a flowchart illustrating a method 300 for sharing an application across multiple virtual machines simultaneously. As shown in FIG. 3, the method begins at step 310 by placing an application on an application storage volume. In at least one example, placing the application on the application storage volume includes setting the application storage volume state to read only.

Thereafter, at step 320 a hypervisor associated with a plurality of virtual machines attaches the application storage volume to each virtual machine concurrently. In particular, the application storage volume, including applications stored thereon, is attached to selected virtual machines. This attachment may be static or dynamic as desired. Once the application storage volume has been attached to the virtual machine by the hypervisor, the operating system within the virtual machine can thereby mount the file system contained on the application storage volume and access its contents.

With the file system containing the applications thus mounted within the virtual machine, the method at step 330 includes making the applications available to a plurality of virtual machines concurrently. Within each virtual machine, the VM agent (in cooperation with the volume detector described later) can detect the presence of the new applications and automatically start the applications contained within the application storage volume or notify the user that new applications are available.

Figure 4:
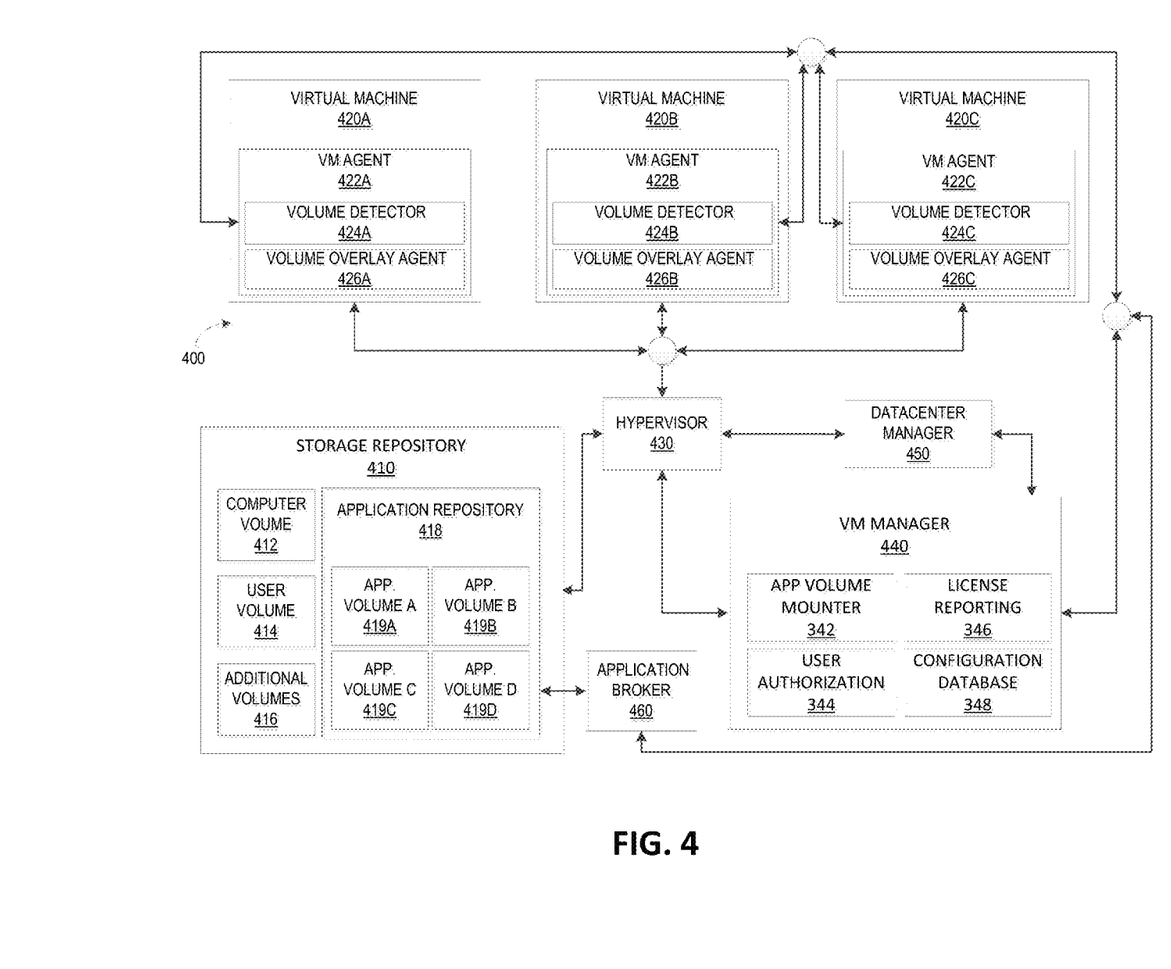
FIG. 4 illustrates a data management system.

FIG. 4 illustrates a system 400 that includes storage repository 410, a plurality of virtual machines 420A-420C executed by a hypervisor 430, and a virtual machine manager (VM manager) 440. In the illustrated example, VM agents 422A-422C running inside the virtual machines 420 contacts the VM manager 440 to request the hypervisor 430 to dynamically attach one or more of the storage volumes 412-416 or applications 419A-419D within an application repository 418 when certain conditions are met. The VM agents 422A-422C, in various embodiments, could be a Windows service, a Unix daemon, or a script.

The VM agents 422A-422C are configured to detect when a specific event happens (an "attach-triggering event") and respond to it by informing the VM manager. An attach-triggering event could be that the operating system in the associated virtual machine 420A-420C is booting ("VM startup"), user has logged into the operating system of the VM ("user logon"), or some other identifiable event. For ease of reference, VM agent 422A running within virtual machine 420A will be described. It will be appreciated that the discussion of the virtual machine 420A and VM agent 422A may be equally applicable to the other virtual machines 420B-420C and VM agents 422B-422C.

Further, the VM manager 440 may be a part of the VM agent 422A itself. In other examples, the VM manager 440 may reside on a separate physical computer or a separate virtual machine that the VM agent 422A communicates with over a network.

The VM manager 440 may be responsible for deciding which of storage volumes 412-416 and/or application volumes 419A-419D should be attached based on the certain criterion. If the attach-triggering event is a VM startup, the VM manager 440 may look for storage volumes that should be applied based on the virtual machine. If the attach-triggering event is a user logon, the VM manager 440 may look for storage volumes that should be applied based on the user.

When the attach-triggering event is a VM startup, the VM manager 440 will look for a writable storage volume associated with the virtual machine 422A (computer volume 412) and any of the application volumes 419A-419D that should be dynamically provided to the virtual machine 422A from the application repository 418. The sharing of the applications 419A-419D across the virtual machines 420A-420C will be discussed in more detail at an appropriate point hereinafter. The VM manager 440 can store this information in its internal memory, in a database (such as Configuration Database 448) or in a directory (such as "Active Directory").

When the attach-triggering event is a user logon, the VM manager 440 will look for a writable storage volume associated with the user (user volume 414) and any application volumes, such as the application volumes 419A-419D in the application repository 418. The user volume 414 may include user-installed applications, Windows profile (home directory), preferences and settings, files, and registry keys (inside of a registry hive). Such a configuration may help the system 400 provide a persistent virtual environment for each user in an efficient manner.

The storage volumes 412-416 and application volumes 419A-419D to be attached to the virtual machine 420A can be selected based on individual identity (a user volume belonging to a particular user) or based on a group (if the virtual machine 422A is a member of a particular group of computers, or if the user is a member of a group of users). For example, if all users in the engineering group need a particular application, such as Microsoft Visual Studio, when a user who is a member of the engineering group logs into the virtual machine 420A, the VM agent 422A will inform the VM manager 440 of the user logon event.

The VM manager 440 will then check for the user volume 414 belonging to the user, any application volumes 419A-419D belonging to the user, and any application volumes 419A-419D belonging to the groups the user belongs to. Upon the system 400 detecting the attach-triggering event, the VM agent 422A communicates with the VM manager 440. In at least one example, the VM manager 440 is responsible for deciding which of the appropriate storage volumes 412-418 and/or applications 419A-419D should be attached to the virtual machine 420A.

In particular, attached volumes described above may contain a file system with files and registry keys. The registry keys can be stored in a file or directory located on the attached volume. In one embodiment, this file format can be a one or more registry hive files (just as the HKEY_CURRENT_USER registry hive is a file named ntuser.dat located within the user's profile). In another embodiment, the registry keys could be represented in a database or a proprietary format describing registry metadata.

In one embodiment, VM agents 422A-422C shown in FIG. 4, can detect when the volume has been attached and enumerate the registry keys on the volume (whether represented as a hive or a set of directories and files on the volume). The VM agent will look for known load points, such as HKEY_LOCAL_MACHINE\CurrentControlSet\Services, to locate programs, services, and drivers to be started. This process of locating programs, services, and drivers to be launched by the VM agents mimics what the operating system would normally do upon starting up. Thus, when an attach-triggering event occurs and the applicable storage volumes are attached, all of the programs, services, and drivers configured located on those volumes will be made available and start as if they were installed traditionally within the virtual machine. In one embodiment, a driver (a mini-filter driver or a file system filter driver, familiar to those skilled in the art) will detect attempts to write to non-persistent file systems (such as the C:\ drive) and will redirect the access to an attached, writable volume dedicated to the user or virtual machine.

Once the VM manager 440 has selected the relevant set of storage volumes based on the attach-triggering event, the VM manager 440 directly or indirectly contacts the hypervisor 430 and requests for the storage volumes 412-416 and/or application volumes 419A-419D to be attached to the virtual machine 420A. For example, the VM manager 440 could directly request the storage volumes 412-416 and/or application volumes 419A-419D to be attached to the virtual machine 420A by connecting to the hypervisor 430 (such as VMware ESX server). The VM manager 440 could indirectly request the storage volumes 412-416 and/or the application volumes 419A-419D to be attached to the virtual machine 420A by connecting to a virtual datacenter manager 450 responsible for managing several hypervisors (such as a VMware vCenter server). Further, application brokers may be utilized with the system to help control and/or optimize the management of data by the system 400, as will be discussed at appropriate locations hereinafter.

In some examples, the computer volumes 412 and user volumes 414 are types of writable storage. In such examples, the computer volumes 412 and user volumes 414 may be specific to each user or virtual machine. In at least one example, the application volumes 419A-419D in the application repository may be read-only and can be shared by multiple virtual machines concurrently. In another example, these application volumes could be writable but non-persistent, such that the changes are discarded once the volume is detached from the virtual machine. Exemplary sharing of the application volumes 419A-419D will now be discussed in more detail.

As previously discussed, to dynamically attach one of the application volumes 419A-419D to the virtual machines 420A-420C, the virtual machine agents 422A-422C can be configured to either (1) directly request the hypervisor 430 to request selected application volumes 419A-419D to be dynamically attached or (2) indirectly request the application volumes 419A-419D to be attached by first communicating with VM manager 440. Communicating with the VM manager 440 may reduce the exposure of the credentials of the hypervisor 430 within each virtual machine.

To enable better distribution of resources, an application broker 460 can be consulted which will choose the best location to source the application volumes 419A-419D from when there is more than one copy of the application volumes available. In one example, the application broker could be responsible for communicating the hypervisor to directly attach the application volume selected. In another example, the application broker merely points to the best location to source the application storage volume from and leaves the responsibility to the VM manager to actually instruct the hypervisor to attach the relevant application storage volume.

To provide redundancy and enable a large number of virtual machines to share an application, the application can be placed into multiple, redundant storage volumes. For example, the application could be located on two different storage volumes within two different data stores within a data center. The application broker 460 may be operatively associated with the application repository 418 to allow the application broker 460 to track availability of and latency to the different application storage volumes containing a selected application.

When the application broker 460 is contacted to request an application, the application broker 460 can dynamically decide which application volumes 419A-419D to attach based on the aforementioned latency and availability checks. In other embodiments, numerous strategies could be used by the application broker 460 to select an application volume such as round-robin, least recently used storage application volume, lowest latency, etc.

In at least one example, each of the virtual machines 420A-420C may include a volume detector 424A-424C respectively. The volume detector 424A-424C can be configured to detect when a new storage volume has been attached to the virtual machine 420A-420C. In one embodiment, this can be a file system filter driver. In another embodiment, this may be a file system mini-filter driver. In another embodiment, this can be a Windows service configured to detect when new storage devices have been attached. Once a new storage volume has been detected, a volume overlay software agent will be invoked (the volume overlay agents 426A-426C). The volume overlay agents 426A-426C may be part of the volume detectors 424A-424C or may be a separate driver as shown. Each of the volume overlay agents 426A-426C is responsible for exposing the data and applications contained in the storage repository 410 and making it available to the corresponding virtual machine 420A-420C.

The volume overlay agents 426A-426C may accomplish this by overlaying the content (such as files and registry keys) on top of the existing virtual machines 420A-420C so that the content can be seamlessly integrated into the virtual machine environments. In addition, if one or more applications contained in a storage volume are meant to start automatically, then the VM agents 422A-422C can enumerate the contents of the volume and automatically start the relevant services or drivers. For example, the VM agent can enumerate all Start registry values to look for services contained in the KEY_LOCAL_MACHINE\SYSTEM\CurrentControlSet\Services subtree that should be automatically started and invoke the relevant APIs (such as ZwLoadDriver and StartService).

The VM agents 422A-422C are also configured to respond to detection of a specific triggering event ("detach-triggering event"). Detach-triggering events include a virtual machine being powered off or a user logging off. When a detach-triggering event occurs, the VM agent contacts the VM manager to report the detach-triggering event. In the same manner outlined in the aforementioned process of handling the attach-triggering event, the VM manager may then directly or indirectly request the hypervisor 430 to detach the storage volume from the corresponding virtual machine 420A-420C. To this point, attachment of the application storage volumes has been discussed generally. In at least one example, once a user logs into a virtual machine, storage will be dynamically attached to the virtual machine without the need to reboot the virtual machine. Once the storage is attached to the virtual machine, the storage will be directly accessible from within the virtual machine. This enables a non-persistent virtual machine to function as if it is a persistent virtual machine.

The storage dynamically attached to the virtual machine utilized by this invention can be in any form supported by the hypervisor and operating system of the virtual machine. The storage dynamically attached to the virtual machine may contain multiple partitions, volumes, and file systems. Storage concepts such as partitions, volumes, and file systems are well-known to skilled artisans and outside the scope of this invention.

In one embodiment, the storage dynamically attached to the virtual machine can be attached through a network (using protocols such as iSCSI or Fibre Channel which reference storage by LUNs, or logical unit numbers). In another embodiment, the storage dynamically attached to the virtual machine is directly attached from physical volumes (raw device mapping) such as a hard disk and hard disk partitions and the hypervisor with pass through access from the virtual machine directly to the hardware. In another embodiment, the storage dynamically attached to the virtual machine can be a virtual device represented by a file (an ISO representing a virtual CD-ROM or a virtual hard disk file such as the VMDK and VHD file formats which represent a disk).

The storage dynamically attached to the virtual machine does not need to be contained within a single physical device or single virtual device represented by a file. The storage may be in the form of different virtual hard disk files or physical devices attached simultaneously which represent "physical volumes" within the virtual machine. These physical volumes will be composed of logical volumes. This approach, known as storage virtualization, allows logical volumes to be abstracted from the underlying physical storage. A logical volume (itself containing a file system) spread out across multiple physical volumes can lead to improved redundancy and performance where logical volumes. Technology to provide this storage virtualization, such as Redundant Array of Independent Disks (RAID for short), logical volumes, and physical volumes, are well-known to skilled artisans and outside the scope of this invention.

Hereafter, "volume" and "volumes" will be used to refer to logical storage volumes visible within the virtual machine including (1) the volume containing the operating system (typically the C: drive for the Windows® operating system) and (2) any dynamically attached storage previously described above.

Whenever the user logs off, the volumes associated with the user are detached. When the user logs into a different virtual machine, the volumes associated with the user are attached to the new virtual machine. As such, the user's writable volume containing the user's data and user-installed applications and any application volumes containing applications assigned to the user will remain available to the user regardless of which virtual machine the user is using.

In another embodiment, if a writable volume needs to be used simultaneously from two different virtual machines (for example, because the user logs in to two separate virtual machines), a new volume can be created that is a differential disk or a delta disk of the writable volume. If a user logs in to two separate virtual machines, each would receive a separate copy of the user's writable volume that can be written to. Only the modifications go into the delta disk. Once the user logs off the virtual machine, the data in the delta disk would be reintegrated into the original volume. If the changes made by the user on the two different virtual machines conflict (such that the changes to the two separate linked clones modify the same data), a software policy can determine the appropriate way to resolve the conflict. A software policy for conflict resolution could be, for example, to favor newer changes such that the delta disk with the most recent modification will pre-empt any older, overlapping modification from a different delta disk.

This invention thus enables applications, services, and drivers to be installed on separate volumes that are dynamically attached after a user has logged in or after a virtual machine has booted up as if the applications, services, or drivers were part of the original virtual machine. This enables the virtual machine to be a minimal virtual machine which only needs to have the VM agents to support dynamically attached volumes. All other programs can be made available at run-time (after a user logs in) depending on which user logs in or which group the user logs into. While an engineer might need a different set of applications than an accountant, they can share the same set of pooled, non-persistent virtual machines.

Because all of these volumes are centrally managed in the data center. The IT department can update software located in the volumes. IT staff can also ensure license compliance (by determining how many users are utilizing a given volume containing the licensed software). In virtual machine environments, storage volumes within the virtual machines contain data items that need to be accessed. Unfortunately, accessing the underlying contents of a storage volume can be very resource intensive, reducing the performance of a virtual machine and other operations within a virtual machine environment.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data management system, comprising:
    detecting, at a virtual machine agent running within a virtual machine, an attach-triggering event;
    transmitting from the virtual machine agent, in response to detecting the attach-triggering event, a first indication to a virtual machine manager, the first indication comprising a first request to attach one or more storage volumes to the virtual machine, wherein the virtual machine manager comprises a separate appliance from the hypervisor or a virtual appliance supported by the hypervisor;
    determining, at the virtual machine manager, one or more selected storage volumes to be attached to the virtual machine based on the first request and transferring a second request to dynamically attach the one or more selected storage volumes to the virtual machine;
    receiving, at a hypervisor, the second request to dynamically attach the one or more selected storage volumes to the virtual machine; and
    dynamically attaching, by the hypervisor, the one or more selected storage volumes to the virtual machine in response to receiving the second request.

2. The method of claim 1, wherein the hypervisor is configured to operate a plurality of virtual machines, the method further comprising making at least one application stored on the one or more selected storage volumes available to a plurality of virtual machines concurrently via the hypervisor.

3. The method of claim 2, wherein the hypervisor comprises one of a plurality of hypervisors managed by a datacenter manager, the method further comprising:
    receiving, at the datacenter manager, a third request to attach the one or more selected storage volumes to the virtual machine; and
    wherein receiving, at the hypervisor, the second request to dynamically attach the one or more selected storage volumes to the virtual machine comprises receiving, at the hypervisor, an instruction from the datacenter manager to attach the one or more selected storage volumes to the virtual machine.

4. The method of claim 1, wherein the attach-triggering event is a user logon or a virtual machine startup event.

5. The method of claim 4, wherein the one or more selected storage volumes include data specific to a user associated with the user logon event or specific to the virtual machine associated with a virtual machine startup event.

6. The method of claim 4, wherein the one or more selected storage volumes include applications in a read-only state associated with a user identified by the user logon event or associated with a virtual machine identified by the virtual machine startup event.

7. The method of claim 6, further comprising tracking instances of each application running on the plurality of virtual machines.

8. The method of claim 7, wherein determining, at the virtual machine manager, the one or more selected storage volumes to be attached to the virtual machine comprises transmitting a request to an application broker configured to select the one or more storage volumes corresponding to the applications associated with the identified user or virtual machine.

9. The method of claim 1, further comprising detecting available storage volumes.

10. A data management system, comprising:
    a plurality of storage volumes;
    a hypervisor executed by a processing system and configured to operate a plurality of virtual machines, wherein at least one of the virtual machines includes a virtual machine agent configured to transmit, in response to an attach-triggering event, a first indication comprising a first request to attach one or more storage volumes to the at least one virtual machine; and
    a virtual machine manager configured to receive the first indication and, in response, identify one or more selected storage volumes to be attached to the at least one virtual machine based on the first request and transfer a second request to dynamically attach the one or more selected storage volumes to the virtual machine, wherein the virtual machine manager comprises a separate appliance from the hypervisor or a virtual appliance supported by the hypervisor,
    wherein the hypervisor is further configured to dynamically attach the one or more selected storage volumes to the at least one virtual machine in response to receiving the second request.

11. The system of claim 10, wherein the hypervisor is configured to mount the one or more selected storage volumes and make at least one application stored on the one or more selected storage volumes available to two or more of the plurality of virtual machines concurrently via the hypervisor.

12. The system of claim 10, wherein the hypervisor comprises one of a plurality of hypervisors, the system further comprising datacenter manager responsible for managing the plurality of hypervisors, and wherein the virtual machine manager is further configured to instruct the datacenter manager to cause the hypervisor to attach the one or more selected storage volumes to the at least one virtual machine.

13. The system of claim 10, wherein the attach-triggering event is a user logon event or a virtual machine startup event.

14. The system of claim 13, wherein the one or more selected storage volumes include data specific to a user associated with the user logon event or specific to a virtual machine associated with the virtual machine startup event.

15. The system of claim 13, wherein the one or more selected storage volumes include applications in a read-only state associated with a user identified by the user logon event or associated with a virtual machine identified by the virtual machine startup event.

16. The system of claim 15, further comprising a license tracker configured to track instances of each application running on the plurality of virtual machines.

17. A non-transitory computer readable medium having program instruction stored thereon for operating a data management system, wherein the program instructions are configured to, when executed by the data management system, direct the data management system to:
- detect, at a virtual machine agent running within a virtual machine, an attach-triggering event;
- transmit from the virtual machine agent, in response to detecting the attach-triggering event, a first indication to a virtual machine manager, the first indication comprising a first request to attach one or more storage volumes to the virtual machine, wherein the virtual machine manager comprises a separate appliance from the hypervisor or a virtual appliance supported by the hypervisor;
- determine, at the virtual machine manager, one or more selected storage volumes to be attached to the virtual machine based on the first request and transfer a second request to dynamically attach the one or more selected storage volumes to the virtual machine;
- receive, at a hypervisor, the second request to dynamically attach the one or more selected storage volumes to the virtual machine; and
- dynamically attach, by the hypervisor, the one or more selected storage volumes to the virtual machine in response to receiving the second request.

18. The non-transitory computer readable medium of claim 17, further having program instructions stored thereon configured to, when executed by the data management system, direct the data management system to:
- mount the one or more selected storage volumes with the hypervisor, the hypervisor being configured to operate a plurality of virtual machines; and
- make at least one application stored on the one or more selected storage volumes available to two or more of the plurality of virtual machines concurrently via the hypervisor.

19. The non-transitory computer readable medium of claim 17, further having program instructions stored thereon configured to, when executed by the data management system, direct the data management system to:
- detect, at the virtual machine agent, a detach-triggering event;
- contact, by the virtual machine agent, the virtual machine manager to report the detach-triggering event;
- receive, at the hypervisor, a second request generated by the virtual machine manager to detach the one or more selected storage volumes from the virtual machine; and
- detach, by the hypervisor, the one or more selected storage volumes from the virtual machine in response to receiving the second request generated by the virtual machine manager.

20. The method of claim 1, further comprising:
- detecting, at the virtual machine agent, a detach-triggering event;
- contacting, by the virtual machine agent, the virtual machine manager to report the detach-triggering event;
- receiving, at the hypervisor, a second request generated by the virtual machine manager to detach the one or more selected storage volumes from the virtual machine; and
- detaching, by the hypervisor, the one or more selected storage volumes from the virtual machine in response to receiving the second request generated by the virtual machine manager.

* * * * *